United States Patent [19]

Jebens et al.

[11] Patent Number: 4,938,552

[45] Date of Patent: Jul. 3, 1990

[54] ELECTROSTATIC OPTICAL FIBER SWITCH

[75] Inventors: Robert W. Jebens, Skillman; William S. N. Trimmer, Belle Mead; James A. Walker, Howell, all of N.J.

[73] Assignee: AT&T Bell Laboratories, Murray Hill, N.J.

[21] Appl. No.: 311,566

[22] Filed: Feb. 15, 1989

[51] Int. Cl.⁵ .............................................. G02B 6/36
[52] U.S. Cl. ............................ 350/96.2; 350/96.13; 350/96.15
[58] Field of Search ................ 350/96.2, 96.21, 96.13, 350/96.15

[56] References Cited

U.S. PATENT DOCUMENTS 4,152,043  5/1979  Albanese ............................. 350/96.2
4,189,206  2/1980  Terai et al. ......................... 350/96.2

FOREIGN PATENT DOCUMENTS 57-6805  1/1982  Japan ................................ 350/96.13
57-20702  2/1982  Japan ................................ 350/96.13

OTHER PUBLICATIONS

*IBM Technical Disclosure Bulletin*, vol. 21, No. 11, Apr., 1979, by J. D. Crow.

*Primary Examiner*—William L. Sikes
*Assistant Examiner*—John Ngo
*Attorney, Agent, or Firm*—Jerry W. Herndon; Gordon E. Nelson

[57] ABSTRACT

An electrostatic optical fiber switch. An aperture in the switch housing allows for switching movement of the end of a fiber. This aperture is formed in part by a groove in which the depth and width of the groove increases continuously with distance toward the end of the fiber. This forms a smoothly curving surface for restraining and aligning the switching end of the fiber when the electrostatic field is applied. This arrangement substantially reduces the voltage required to operate the switch by prior electrostatic switches.

11 Claims, 3 Drawing Sheets

ELECTROSTATIC OPTICAL FIBER SWITCH

TECHNICAL FIELD

The invention relates generally to the field of optics and particularly to optical fiber switching by electrostatic means.

BACKGROUND OF THE INVENTION

A number of different designs of optical fiber switches are known. A typical form of such a switch is a single pole-double throw in which one fiber is physically moved into optical connection with one of two other fibers in response to some form of stimulus. Other forms, such as single pole-single throw or double pole-double throw, are also common. It is known to operate such switches by electromagnetic and electrostatic forces. Each type has inherent advantages and disadvantages. A major disadvantage of electrostatic switches has traditionally been the high voltage required to generate a sufficiently high electrostatic field to operate a switch. Typically, voltages in the range of four hundred volts have been required. U.S. Pat. No. 4,152,043, issued to A. Albanese, and entitled "Electrostatic Optical Switch with Electrical Connection to Coated Optical Fiber" describes such a switch requiring high voltage for operation. Voltages this high are incompatible with many applications. Electrostatic optical fiber switches would be more practical and useful if solutions could be found to reduce the voltage required for operation.

SUMMARY OF THE INVENTION

An electrostatic optical fiber switch comprises a switch housing having an internal first channel extending from an outside surface of the housing for fixedly receiving a first switchable fiber. The first channel extends into an aperture of the housing of dimensions sufficient to allow switching movement of the end of the first fiber. A conductive coating near the switching end portion of the first fiber in the aperture and means for creating an electrostatic field in the aperture cooperate electrostatically to operate the switch. The aperture is formed in part by at least one smoothly curving surface for restraining and guiding the switching end portion of the first fiber when the electrostatic field is applied. This smoothly curving surface substantially reduces the voltage required to operate the switch.

In a preferred embodiment, the housing further has an internal second channel for fixedly receiving and optically aligning a second optical fiber with the first optical fiber when the first optical fiber is in one of its switched or unswitched positions. The channels are formed by grooves in mating surfaces of members that form the housing. The aperture is formed in part by a third groove section colinear with the first groove section, in which the third groove section continuously increases in depth and width in a direction toward the switching end of the first fiber. Preferably, the grooves are vee grooves.

DETAILED DESCRIPTION

Figure 1:
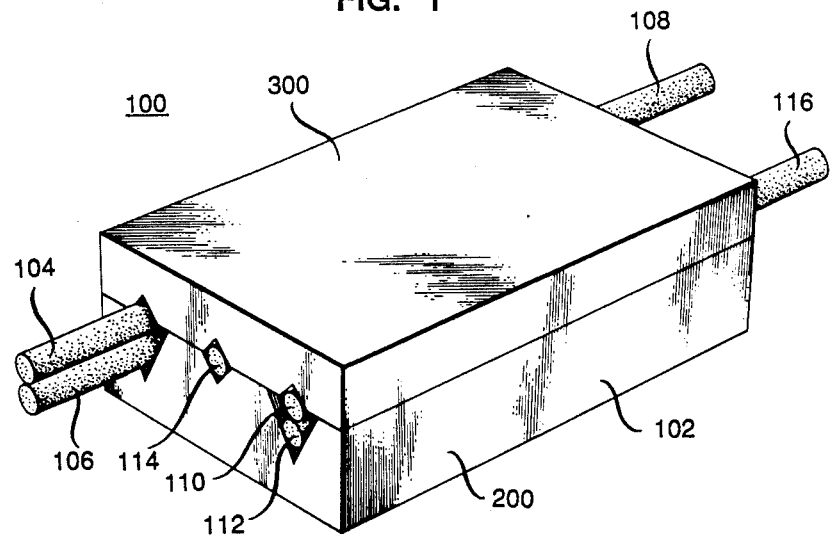
FIG. 1 shows a perspective view of an assembled switch, including the incoming optical fibers.

The preferred embodiment is a double pole-double throw switch 100 as shown in FIG. 1. The attributes of double throw and double poles are not limitations of the invention. In the illustrative embodiment of FIG. 1, two fixed optical fibers 104 and 106 enter a switch housing 102 from one side. On the opposite side, a switchable fiber 108 enters housing 102 and is optically aligned (switched) with one or the other of the fixed fibers 104 and 106. In accordance with the preferred embodiment a second set of fibers 110, 112 and 114 also enter the switch housing 102. However, since the details of operation are identical for the second set of fibers, the discussion will proceed only with respect to the first set. In the following discussion, reference is made only to a single switch element, it being understood that, in principle, any number of switch elements may be contained in a single assembly.

Figure 2:
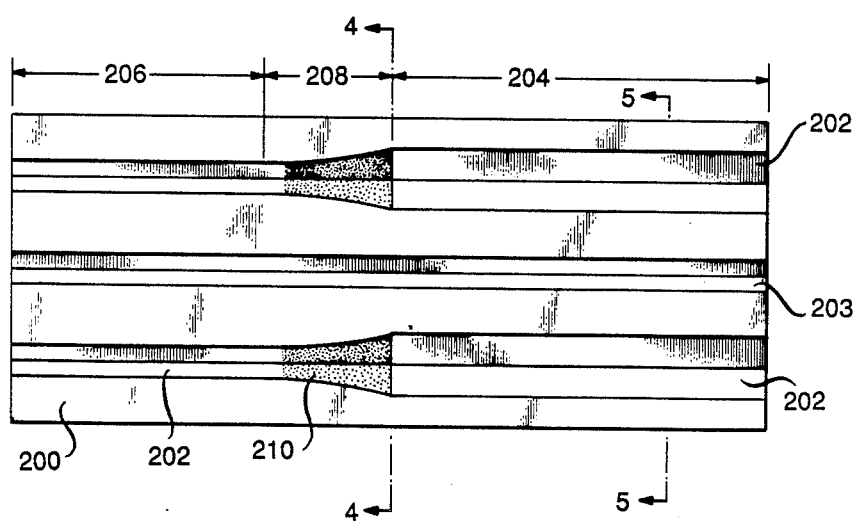
FIG. 2 shows a view of the internal surface of a first base member which comprises a switch, in which vee grooves are shown for supporting and aligning optical fibers.
Figure 3:
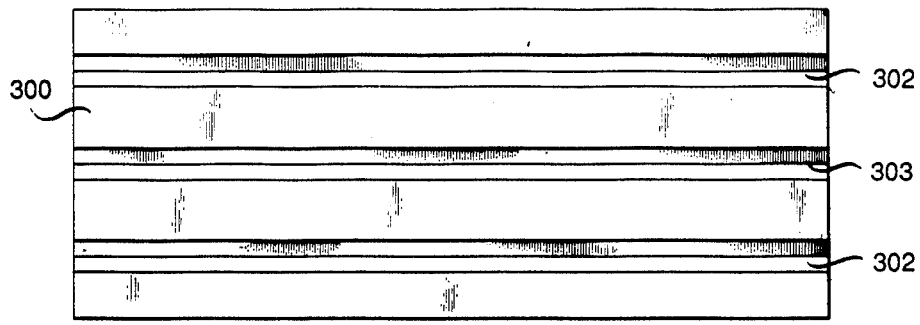
FIG. 3 shows a view of the internal surface of a second base member also containing vee grooves corresponding to the vee grooves in the first base member for supporting and aligning optical fibers.
Figure 4:
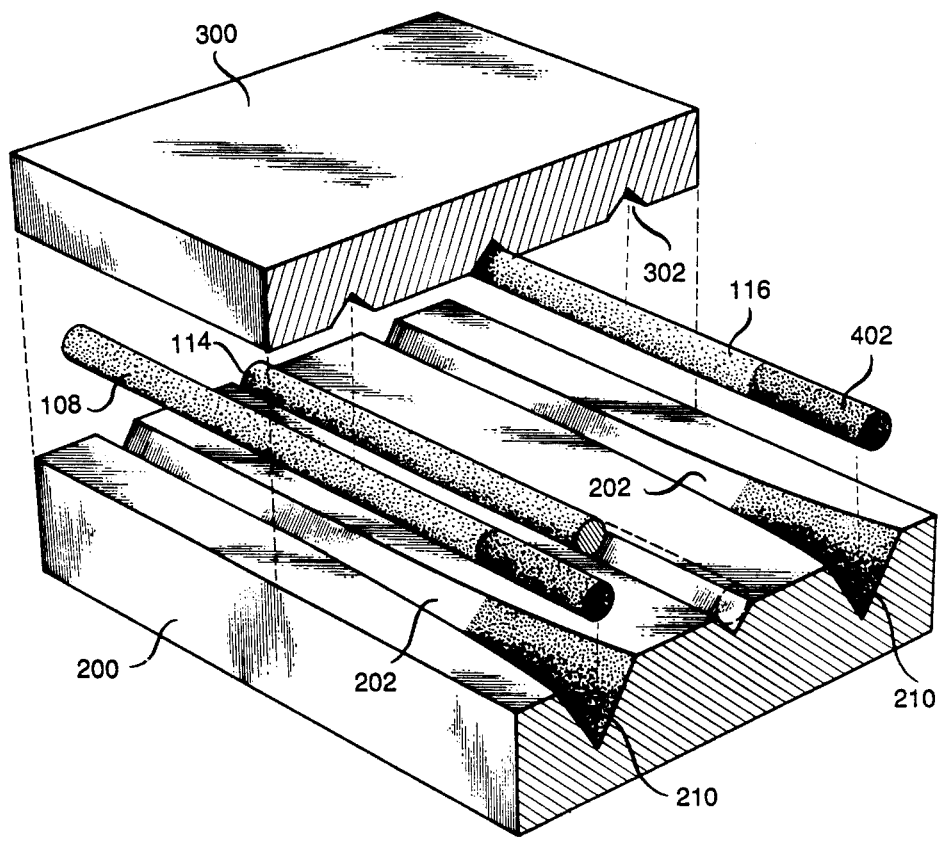
FIG. 4 shows a cross-sectional view of the first and second base members, including a curved section of a vee groove for supporting and aligning a switching end of a switchable fiber.
Figure 5:
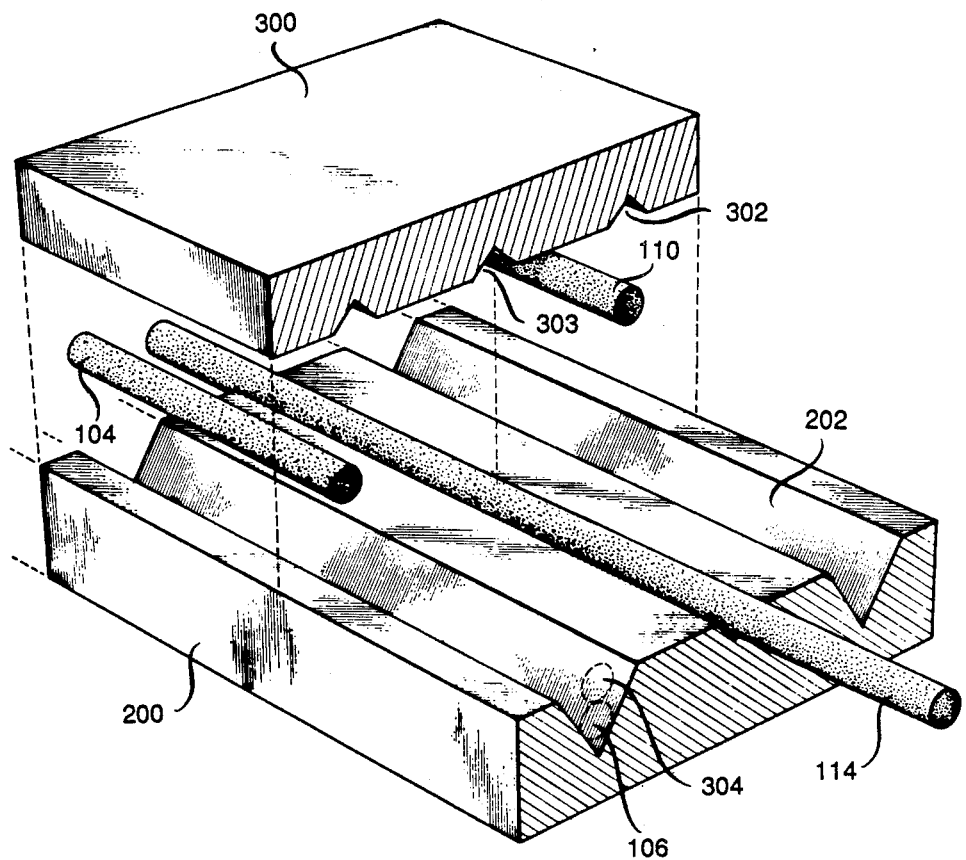
FIG. 5 shows another cross-sectional view of the first and second base members.

The switch housing 102 comprises two base members 200 and 300, shown in FIGS. 2 and 3, respectively. These base members may be made of metal, plastic or other suitable material. FIG. 2 shows the internal surface of base member 200. FIG. 3 shows the surface of base member 300 that mates with the surface shown in FIG. 2. Optical fibers are omitted from FIGS. 2 and 3 for clarity. FIG. 4 shows a cross-sectional view 4—4 of the first base member 200, viewed in a direction as shown in FIG. 2. Similarly, FIG. 5 shows a cross-sectional view 5—5 of base member 200, as indicated in FIG. 2. FIGS. 4 and 5 also show appropriate exploded cross-sectional views of the base members 200 and 300.

In FIG. 2, two vee grooves 202 extend longitudinally from one side of base member 200 to the opposite side. The two grooves are identical. A first section 204 of a groove in base member 200 receives the end of fixed optical fiber 106 (see FIG. 5). A second section 206 of a groove in the base member 200 receives a fixed portion of the switchable fiber 108 (see FIG. 4). A third groove section 208 located between the first and second sections in base member 200 provides switching space for the switching end 402 of switching fiber 108 (see FIG. 4). FIG. 3 shows grooves 302 in the base member 300. These grooves mate with grooves 202 in base member 200 for fixedly receiving optical fibers 104 and 110, as shown in FIG. 1. In addition, both base members 200 and 300 may have mating aligning vee grooves 203 and 303 in FIGS. 2 and 3, respectively, for receiving an alignment fiber 114, as shown in FIGS. 1, 4 and 5.

In accordance with the invention, the groove section 208, corresponding to the switching end of switchable fiber 106, increases in depth smoothly and continuously in a direction towards the inner part of the base member 200. At the same time the width of groove section 208 continuously increases to form a flared end, as shown in FIGS. 1 and 4. This curved and flared groove section 208 can be formed in the base member 200 by diamond point machining or other suitable means. An electrode 210 is formed on the walls of vee groove section 208 to which a voltage can be applied. The electrode 210 is indicated in FIGS. 2 and 4 by cross-hatching. This electrode 210 may be formed by vacumn deposition of a conductor, such as aluminum or gold. The switching end 402 of switchable fiber 108 located in groove section 208 is coated with a conductive material, such as aluminum. The conductive coating is further coated with a thin insulator, such as silicon dioxide or an epoxy film, of about 1 micron thickness.

When a sufficient voltage is applied to electrode 210, the electrostatic forces thus established between the end 402 of fiber 108 and the electrode 210 causes the end 402 of fiber 108 to be pulled into the curved groove section 208. In effect, the end 402 of fiber 108 wraps around the curve of the deepening vee groove.

This wrapping motion greatly reduces the voltage required to achieve the switching operation of fiber 106 over the prior art. This is so because part of the end 402 of the fiber is always in a high field, high force region close to the electrode 210. Theoretical limits of the voltages required for operation are examined in the attached Appendix.

Obviously, the curve of groove section 208 may take many forms. One curve that has been made satisfies the equation Depth=Constant+(Depth variation)*$(x^4-4x^3+6x^2)/3$ where x is the fraction of the distance along the groove section. This is the equation of a uniformly loaded beam, fixed at one end. This particular curve causes the switching end 402 of fiber 106 to be unstable. That is, the fiber switches only after a threshold voltage is exceeded and releases with a different lesser threshold voltage. Thus, the end 402 of fiber 106 snaps between its switched and released positions when a voltage is applied to electrode 210.

In the Appendix, goove curvatures are discussed that cause the fiber to change its deflection gradually as the voltage is increased. These slowly changing deflections can be used to actively align single mode fibers in an active optical fiber connector, for example.

The voltage required to bend the fiber around the curved electrode is $$V = \sqrt{\frac{k \cosh^{-1}(S/R)}{8\pi\epsilon}} \frac{1}{r}$$

where k is the spring constant of the optical fiber, S/R is the ratio of fiber-electrode separation to the fiber diameter, and r is the radius of curvature of the electrode.

One switch that has been constructed has a 1 micron thick insulation coating of epoxy on the end 402 of fiber 108, and a curved groove section 208 which is 1.8 centimeters long. The depth of the curved groove satisfied the equation Depth(microns)=$(5.57*x^4-4^3x+6x^2)/3$ where x is in centimeters. From the above equation, at least 60 volts is needed to initially move the switch. In operation, 120 to 140 volts were actually required. Fibers 106 and 108 stayed in alignment in the switched position until the voltage dropped below 40 volts.

This operating voltage can be lowered by using a thinner insulating coating on the switchable fiber or a longer length of the moving portion of the fiber.

Electrostatic forces can also be used to provide the 5 or 10 micron motions needed to align single mode fibers in an active optical fiber connector, for example. Using a groove section 208 with a different characteristic curve, such as $y=x^n$ where n<2, the amount of fiber wrapped around the curved groove section 208 changes with voltage. By changing the voltage applied to electrode 210, the fiber 108 can be moved into alignment with a stationary fiber.

It is understood that the above described arrangements are merely illustrative of the application of principles of the invention and that other arrangements may be devised by workers skilled in the art without departing from the spirit and scope of the invention.

APPENDIX

Analysis of Required Electrostatic Force

This appendix analyzes the theoretical limitations in the use of electrostatics to align and multiplex optical fibers. A conductively coated fiber that wraps around a curved electrode is assumed. Applying voltages between the fiber and electrodes causes the fiber to move. This analysis shows that fibers can be electrostatically aligned with tens of volts, and can be switched with less than a hundred volts.

To bend a section of fiber into an arc of radium $r_0$ requires some energy $E_k$. This energy must be equal or less than the electrostatic energy, $E_C$, available to bend the fiber. Equating $E_k=E_C$ gives the theoretical limits of what can be designed.

The force on a small cross section of a bent fiber at a radius q from the center of the fiber is $$\Delta F = EA \frac{\Delta l}{l}$$

E is Young's modulus, $(\Delta l)/l$ is the fractional change in the length of this section due to bending, and A is the area of the cross section (b*dq). The energy required to stretch this section along the fiber axis for the particular radius of curvature of the bend, $\Delta l_{max}$ is $$dE_s = \int_0^{\Delta l_{max}} \Delta F_s \, d\Delta l$$

$$= \int_0^{\Delta l_{max}} \frac{Ebdq}{l} \Delta l \, d\Delta l$$

$$= \frac{Ebdq}{l(\approx l_0)} \tfrac{1}{2}\Delta l_{max}^2$$

since $$\Delta l_{max} = \frac{l_0 q}{r_0}$$

where $l_0$ is the length of the section $$dE_s = \frac{Ebl_0 q^2}{2r_0^2} dq$$

Integrating the sections in the top half (assuming the line of zero stress is in the center of the fiber) gives the energy stored in half the fiber, $\tfrac{1}{2}E_k$.

$$\tfrac{1}{2}E_k = \int dE_s$$
$$= \int_{q=0}^{n} \frac{Ebl_0}{2r_0^2} q^2 \, dq$$
$$= \frac{Ebl_0}{6r_0^2} n^3$$

and $$E_k = \frac{Ebl_0 a^3}{24r_0^2}.$$

The deflection $\Delta y$ of the bent fiber is now calculated. The arc of the bent fiber satifies the equation $$x^2 + y^2 = r_0^2$$

And at the end of the fiber, $$x_e = l_o$$

$$y_e = r_0 - \Delta y$$

$$\frac{1}{r_0} = \frac{2\Delta y}{l_0^2}$$

giving $$E_k = \tfrac{1}{2}\left(\frac{Eba^3}{3l_0^3}\right)\Delta y^2 = \tfrac{1}{2}k\Delta y^2.$$

The spring constant k is $$k = \frac{Eba^3}{3l_0^3}.$$

A square cross section of the fiber is analyzed above to simplify the presentation. The equation of k for a circular cross section of the fiber differs from the above equation by a constant. Note that the value of k depends upon $l_0^3$.

The electrostatic energy can be calculated from the capacitance, C, between a fiber and an electrode and the voltage, V applied to create an electrostatic field. For a fiber of outer radius R and length $l_0$ with a conductive coating on the surface, and an electrode a distance S away from the center of the fiber, the capacitance in MKS units is $$C = \frac{2\pi \epsilon l_0}{\cosh^{-1}\frac{S}{R}},$$

and the energy available is $$E_C = \tfrac{1}{2}CV^2$$
$$= \frac{\pi \epsilon l_0}{\cosh^{-1}\frac{S}{R}} V^2.$$

The capacitance of the fiber far from the electrode is small, and is ignored to simplify the calculation.

To move the fiber, the electrostatic energy available has to be equal or greater than the energy needed to bend the fiber to the corresponding radius of curvature. Set $$E_C = E_k$$

$$\frac{\pi \epsilon l_0}{\cosh^{-1}\frac{S}{R}} V^2 = \tfrac{1}{2}k\, \Delta y^2,$$

and $$V = \sqrt{\frac{k \cosh^{-1}(S/R)}{2\pi \epsilon l_0}} \, \Delta y$$

or rewriting in terms of the radius of curvature r $$V = \sqrt{\frac{kl_0^3 \cosh^{-1}(S/R)}{8\pi \epsilon}} \, \frac{1}{r}$$

Two examples are calculated. First, the case of fiber switching where one fiber is moved between two output fibers; and second, the case of fiber alignment, where one fiber is moved by precise amounts to align it with another fiber. Here it is assumed the fiber is wrapping around a mandrel of constant radius, r. For fiber switching, the fiber must be moved by at least its diameter. Because there can be an electrode above and below the fiber, each electrode has to move the fiber half its diameter, or about 70 microns. For the alignment case the fiber must be moved approximately 10 microns. Assuming a one centimeter length of fiber in air, and a two micron insulator on the electrodes, the values for the switching case (and the aligning case) are:

$$l = 10^{-2} m$$

$$\epsilon = 8.85 \times 10^{-12} (F/m)$$

$$\Delta y = 7 \times 10^{-5}(10^{-5}) m$$

$$S = 6.2 \times 10^{-5} m$$

$$R = 6 \times 10^{-5} m$$

$$\cosh^{-1}(S/R) = 0.257$$

$$k = 1.9 (nt/m)$$

giving a voltage of $$V = 65 \text{ volts} (9.3 \text{ volts}).$$

Hence the minimum voltage needed to move a one centimeter fiber between two output fibers is 65 volts. The smaller motions needed to align fibers require about 10 volts. If the length of the fiber doubles, to two centimeters, the required voltages decrease by a factor of four. If instead of air, a fluid of relative dielectric permittivity equal to four is used, the voltages can be decreased by an additional factor of two.

We claim:

1. An optical fiber switch comprising a switch housing having an internal first channel extending from an outside surface of the housing for fixedly receiving a first switchable fiber, the first channel extending into an aperture of the housing of dimensions sufficent for allowing switching movement of the end of the first fiber, a conductive coating near the switching end portion of the first fiber in the aperture, and means for creating an electrostatic field in the aperture, the switch being characterized in that the aperture is formed in part by a flared portion of the first channel for supporting the switching end portion of the first fiber along an arc of the flare in a switched state when the electrostatic field is applied.

2. The switch of claim 1 wherein the housing further comprises first and second base members, each having a mating surface for contacting a like mating surface of the other base member and each such mating surface having mating first groove sections extending from the outside surface of the respective base member for forming the first channel.

3. The switch of claim 2 wherein the flared portion of the aperture is formed by a second groove section colinear with the first groove section, the second groove section continuously increasing in depth and width in a direction toward the switching end of the first fiber.

4. The switch of claim 3 wherein the increasing depth of the second groove section is arranged to cause gradual movement of the first fiber as the electrostatic field is increased.

5. The switch of claim 3 wherein the increasing depth of the second groove section is arranged to cause switching movement of the first fiber above a first threshold value of the electrostatic field and to release the first fiber below a second threshold value of the electrostatic field.

6. The switch of claim 4 or claim 5 where the aperture is internal to the housing and the housing further comprises a third channel extending from an outside surface of the housing for fixedly receiving and optically aligning a second optical fiber with the first optical fiber when the first optical fiber is in one of its switched or unswitched positions.

7. The switch of claim 4 or claim 5 wherein the mating surfaces of the first and second base members further comprise mating third groove sections colinear with the first groove sections and the internal aperture for forming the third channel.

8. The switch of claim 6, wherein the groove sections each comprise vee grooves.

9. The switch of claim 8 wherein the means for creating an electrostatic field further comprise electrodes located in the third groove section connected to a source of voltage.

10. The switch of claim 7, wherein the groove sections each comprise vee grooves.

11. The switch of claim 10 wherein the means for creating an electrostatic field further comprise electrodes located in the third groove section connected to a source of voltage.

* * * * *